United States Patent
Rossa et al.

(10) Patent No.: US 8,984,245 B2
(45) Date of Patent: Mar. 17, 2015

(54) MEMORY PROTECTION UNIT AND METHOD FOR CONTROLLING AN ACCESS TO MEMORY DEVICE

(75) Inventors: Christine Rossa, Ditzingen (DE); Bernd Mueller, Leonberg (DE); Markus Ferch, Grossbottwar (DE); Carsten Gebauer, Boeblingen (DE); Dieter Thoss, Schwieberdingen (DE); Michael Ebert, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 13/306,715

(22) Filed: Nov. 29, 2011

(65) Prior Publication Data

US 2012/0144140 A1 Jun. 7, 2012

(30) Foreign Application Priority Data

Dec. 3, 2010 (EP) .................................... 10193580

(51) Int. Cl.
*G06F 12/14* (2006.01)
*G06F 21/79* (2013.01)

(52) U.S. Cl.
CPC ............ *G06F 12/1425* (2013.01); *G06F 21/79* (2013.01)
USPC .................................. 711/163; 711/E12.091

(58) Field of Classification Search
CPC . G06F 12/1416; G06F 12/1458; G06F 12/00; G06F 12/14
See application file for complete search history.

(56) References Cited

U.S. PATENT DOCUMENTS

| | | | |
|---|---|---|---|
| 6,779,044 B1 * | 8/2004 | Katoh ............................... 710/5 |
| 7,069,452 B1 * | 6/2006 | Hind et al. ........................ 713/1 |
| 8,266,176 B2 * | 9/2012 | Nakamura et al. ............ 707/781 |
| 8,555,013 B1 * | 10/2013 | Vick et al. ..................... 711/163 |
| 2001/0052054 A1 * | 12/2001 | Franke et al. ................. 711/147 |
| 2006/0117177 A1 * | 6/2006 | Buer .............................. 713/155 |
| 2008/0028128 A1 | 1/2008 | Rueping |
| 2008/0155188 A1 | 6/2008 | Courcambeck et al. |

FOREIGN PATENT DOCUMENTS

DE 40 34 444 A1 5/1992
EP 0 600 113 A1 6/1994

* cited by examiner

*Primary Examiner* — Charles Rones
*Assistant Examiner* — Tian-Pong Chang
(74) *Attorney, Agent, or Firm* — Maginot, Moore & Beck LLP

(57) ABSTRACT

A memory protection unit includes at least a first access control unit and a second access control unit programmed for controlling an access to a memory device. Further a method to operate a processing system comprising multiple processing devices and multiple memory protection units associated to the multiple processing devices. The access to the memory by a processing device is approved if first access control unit and second access control unit of the memory protection associated to the processing device approves the access and access is rejected if first access control unit or second access control unit rejects the access. The first access control unit is programmable by the associated processing device alone and the programming of the second access control unit is readable by an additional processing device which is to be used in a system with multiple programming devices, not the associate processing device.

15 Claims, 5 Drawing Sheets

MEMORY PROTECTION UNIT AND METHOD FOR CONTROLLING AN ACCESS TO MEMORY DEVICE

This application claims the benefit of priority to Application Serial No. EP 10193580.7, filed on Dec. 3, 2010 in the European Patent Office, the disclosure of which is incorporated herein by reference in its entirety.

BACKGROUND

The present invention relates to a memory protection unit and a method of protecting a memory device from being unauthorized accessed and managing the access to the memory areas in a multiprocessing system having a multiple processing devices. In general this invention is applicable to all kind of memory devices for protecting the memory.

There are different types of devices and memory management units in use to protect a memory. The patent US 2008/0155188 discloses such a memory protection unit.

SUMMARY

The memory protection unit and the method according to the independent claims have the advantages that, by using two access control units a very safe and at the same time very flexible memory protection can be realized. One of the access control unit protects the memory against unwanted access by different program device. The other access control unit protects the memory against unwanted access of different programs or tasks that are executed by one processing device.

Further advantages are realized by the features of the dependent claims.

By using a hardware unit the possibility of software errors to allow unwanted access is reduced. The hardware unit protects the memory device from software errors. The software errors cannot generate illegal access to the memory device.

Further the hardware unit ensures that the programming of a second access control unit cannot happen by a associated processing device. The second access control unit is programmable by any other processing device which is not the associated processing device. This prevents the associated processing device from programming wrong addresses on the second access control unit.

The hardware unit can have a lock register which further controls the subsequent programming of the second access control unit. Any attempt for further programming generates an error signal. Thus the memory protection unit is more protected from illegal programming.

The memory protection unit can be made such that it needs a reset signal to program the second access control unit and can be programmed only for one time after the reset and/or within only a some specific period of time after the reset. The second access control unit is not programmable during normal operation. Thus the memory protection unit is more protected. Since the memory protection unit is protected, it provides more protection to the memory device.

One very effective method of checking the correct programming of the second access control unit is, that each processing device checks periodically the stored access rights of all the second access control units and compares with the desired access rights to memory areas. If the check fails an error signal is generated. Thus it prevents the multiple processing devices from accessing memory areas which they are not allowed to. This method requires very few resources. This method is applied again if the second access control unit is programmed. Thus each time it ensures the correct content of the access rights of the second access control unit.

The second access control unit can be programmable by a safe core and programming of the second access control unit can be checked by the safe core itself. Thus the safe core controls the whole system. The safe core is protected against random hardware errors as well as software errors which further makes the system very safe. A high degree of protection can be achieved by the safe core.

DETAILED DESCRIPTION

Figure 1:
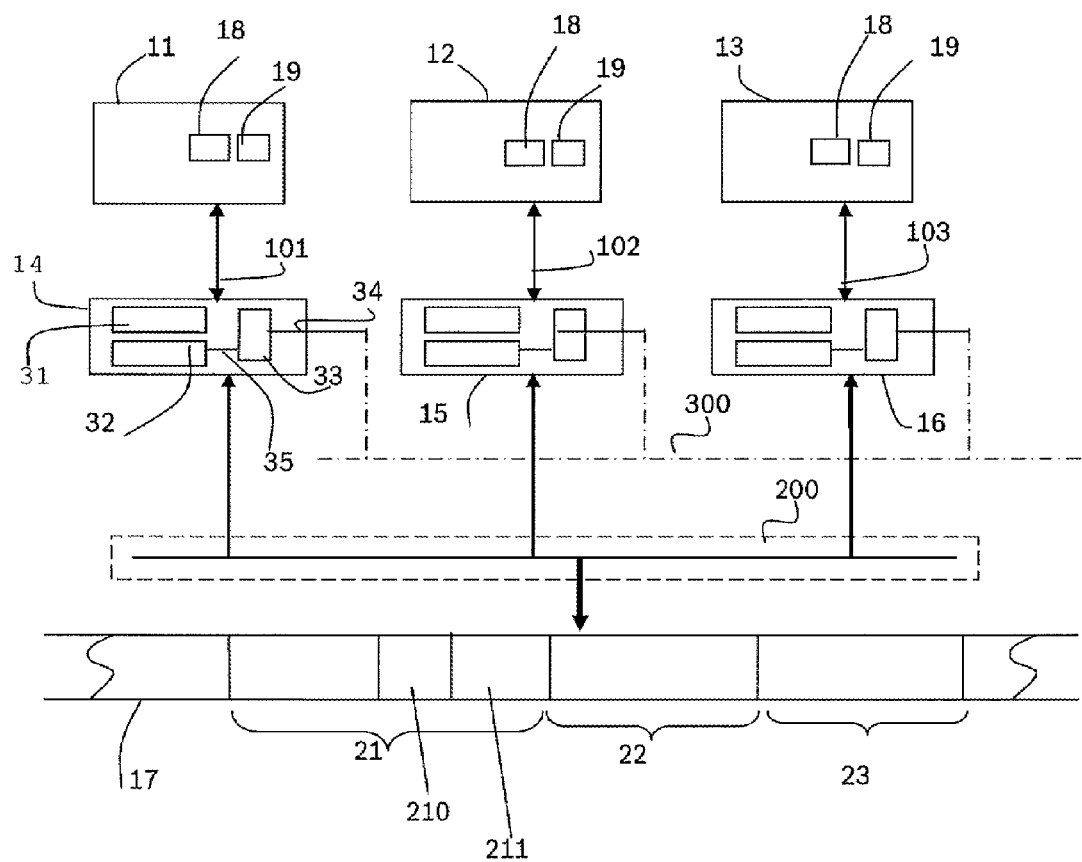
FIG. 1 illustrates a functional block diagram of a memory protection unit according to an embodiment of the present invention in a multiprocessor system.

FIG. 1 shows a block diagram comprising multiple processing devices 11, 12, 13. A first processing device 11 is connected via communication line 101 to a first memory protection unit 14. A second processing device 12 is connected via communication line 102 to a second memory protection unit 15. A third processing device 13 is connected via communication line 103 to a third memory protection unit 16. The memory protection unit 14, the memory protection unit 15 and the memory protection unit 16 are connected to a memory device 17 via system bus 200. The system bus may be a bus system, a crossbar an interconnect or any other chip internal communication system. The memory protection units 14, 15, 16 each have a first access control unit 31, a second access control unit 32 and a hardware unit 33. The hardware unit 33 is connected to the second access control unit 32 via an internal reset signal 35. The hardware unit 33 has an external pin 34 which is connected to a reset line 300. Although the first access control unit 31, the second access control unit 32 and the hardware unit 33 have corresponding functions within 14, 15, 16, they are not "equal". In an implementation the memory protection unit may also be considered as a part of a processing device or as a part of the communication system.

The processing device 11 is associated to the memory protection unit 14 such that the processing device 11 can access the memory device 17 only through the memory protection unit 14. Similarly, the processing device 12 and 13 are associated to the memory protection unit 15 and 16 such that these processing devices can access the memory device 17 only through the memory protection unit 15 and 16 respectively. An access means the processing devices 11, 12, 13 gives out the address for enabling reading or writing to the memory device 17.

The processing device 11, 12, 13 is a processor capable of executing a program or a controller capable of issuing a read or write command to a memory device 17. The processor can for instance be a central processing unit—CPU, a peripheral processor or a coprocessor. The controller can be such as the direct Memory access (DMA) controller or CAN controller.

The memory device 17 is an assembly of memory cells for storing a data or programs on a temporary or permanent basis that can be accessed through an address. All or part of the memory can be accessed by the processing devices 11, 12 and 13. For example the memory device 17 can be a RAM, ROM, FLASH or Non volatile RAM etc or a memory interface of a peripheral component or a combination of such memory devices.

The program represented by 18, 19 are executable instruction sequences of any size executed by the processing devices 11,12 or 13. There can be many various such programs executed by the processing devices and they may need an access to the memory device 17. The programs may utilize full or part of the memory device 17. Reference will now interchangeably be made to the terms "program" or "task".

The memory device 17 can be available for processing devices 11, 12, 13 as "read" only option or with "read" and "write" option. A part of the memory device 17 can be dedicated to be accessible only by certain processing devices or certain programs. As shown in the FIG. 1 the memory areas 21, 22, 23 are dedicated for different processing devices 11, 12, 13. A memory area 21 shows a sub structure given by memory areas 210, 211 assigned dynamically in dependence of which tasks 18, 19 is executed by the processing device 11. The memory area reserved for a particular program executed by the processing device may not be allowed to write or even read accessible by another processing device and vice versa. FIG. 1 shows the memory area 21 which is intended to be accessible only by the programs that are executed by the processing device 11. Further the memory area 23 can be accessible only by the programs that are executed by the processing device 12. The memory area 22 is accessible only by processing devices 12.

Depending on which program 18, 19 is executed by the processing device 11, the first access control unit 31 grant access to different sub memory areas 210, 211. This is achieved by dynamically reprogramming the first access control unit 31.

For simplicity the description in the following paragraphs is explained with respect to the processing device 11 and the memory protection unit 14. Unless otherwise stated the similar procedure is also applicable as well for other processing devices 12, 13 and the memory protection units 15, 16.

The first access control unit 31 and the second access control unit 32 of the memory protection units 14, 15, 16 have a function to check the address and the mode (read, write, control) of an access command of the processing devices 11, 12, 13. For this purpose the restrictions on admissible addresses are stored in the first and second access control units 31,32. Any access for reading or writing to the memory device 17 by the associated processing devices 11, 12, 13 are done through the memory protection units 14, 15, 16. The access is approved to the associated processing device 11 for the requested address if first access control unit 31 and second access control unit 32 approve the access. The access is rejected if either the first access control unit 31 or the second access control unit 32 rejects the access.

The first access control unit 31 of corresponding memory protection unit 14 is programmable by associated processing device 11. The first access control unit 31 is programmed dynamically for each task 18, 19. The programming of first access control unit 31 should not be part of a running task itself. Therefore the programming is only allowed by specific part of the program running in the associated device 11. Preferably, the first access control unit 31 should be programmed only through an operating system. The memory area 210 is allowed to be accessed only by the task 18 and the memory area 211 is accessible only for the task 19 and this is programmed by the operating system. In this way the task 18, 19 can thus only have access to permitted memory areas 210, 211. Thus first access control unit 31 provides memory protection from an unintentional program error on this processing device 11. An operating system is a software that controls the execution of programs and controls the allocation and usage of resources such as memory, CPU time, input and output devices.

The second access control unit 32 provides memory protection for the memory areas that are defined. Any access for reading or writing to the memory device 17 by the associated processing devices 11, 12, 13 must be granted by the second access control units 32. For this purpose the instructions on admissible addresses are stored in the second access control unit 32. The second access control unit 32 is programmed to allocate memory areas for different processing devices 11, 12, 13 Different methods of programming the second access control unit 32 are described in the following examples.

A first example allows programming of the second access control unit 32 by the associated processing device. But the programming of the second access control unit 32 is readable by other processing devices which are not the associated processing device. In a first step, after initialization, the first access control unit 31 and second access control unit 32 of each memory protection units 14, 15, 16 are programmed by the associated processing devices 11, 12, 13. After the programming of the second access control unit 32 is read by at least one other processing device which is not the associated processing device. As an example the processing device 11 can program the second access control unit 32 of the memory protection unit 14. The programming of the second access control unit is read by either 12 or 13 which is not the associated processing device and compared to the desired programming of the second access control unit 32. If the comparison fails, an error will be signalled in the system and appropriate reactions will be triggered. As above it can be ensured that, the programming of second access control unit 32 can be considered static.

A further example of programming the second access control unit 32 of the memory protection unit of all the associated processing device is performed exactly by one processing device and then correctness of programming is checked by another processing device. As an example in the FIG. 1 the second access control unit 32 of the memory protection unit 15 and 16 is programmable by processing device 11 and checking of the programming is done by programming device 12. The second access control unit 32 of the memory protection unit 14 is programmable by processing device 12 and checking of the programming is done by programming device 13.

An alternate method of programming and checking the second access control unit 32 is that the processing device 11 can program the second access control unit 32 of the memory protection unit 15 and checking can be done by the processing device 13. The processing device 12 can program the second access control unit 32 of the memory protection unit 16 and checking can be done by the processing device 11. Similarly the processing device 13 can program the second access control unit 32 of the memory protection unit 14 and checking can be done by the processing device 12.

An alternate method for checking the correctness of stored programming of second access control unit 32 is that the second access control unit 32 can be read from all the processing devices. The processing devices check periodically the correct programming of all the second access control units 32 by reading the stored programming of the second access control unit 32 of all the memory protection units. By this method it is determined which part of the memory areas 21, 22, 23 are accessible by which processing device. This information is then compared to a desired allocation of memory area 21, 22, 23 to the processing device. If the check fails an error signal can be generated for instance to the predefined processing device to reprogram the second access control unit 32. For example the memory area 22 should only accessible by the processing device 12. If the second access control unit 32 of the memory protection unit 14 and 16 has been programmed to give access to the processing devices 11 and 13 for the memory area 22, then the processing device 12 can generate an error signal to the processing devices 11 and 13 to reprogram the second access control unit 32 of the memory protection unit 14 and 16. Alternatively the error signal could also cause a system wide reaction like shut down or reset.

As explained above, the programming and checking of second access control unit 32 by which processing device can be made configurable during initialization.

In a multiple processing system as shown in the FIG. 1, some processing devices may be controllers such as DMA controller or CAN controller on which programs cannot execute. In such a system, at least two processing devices of the system, for example 11, 12, must be a processors such as a central processing unit, a coprocessor, a peripheral controller or other unit on which programs can execute and others can be a processing device like bus masters on which no programs executes such as DMA controller or CAN controller, for example 13. In this case the processing devices 11, 12 will take care of programming and checking correctness of programming the first 31 and second access control unit 32 of the memory protection units 16 associated to the processing device 13.

Figure 2:
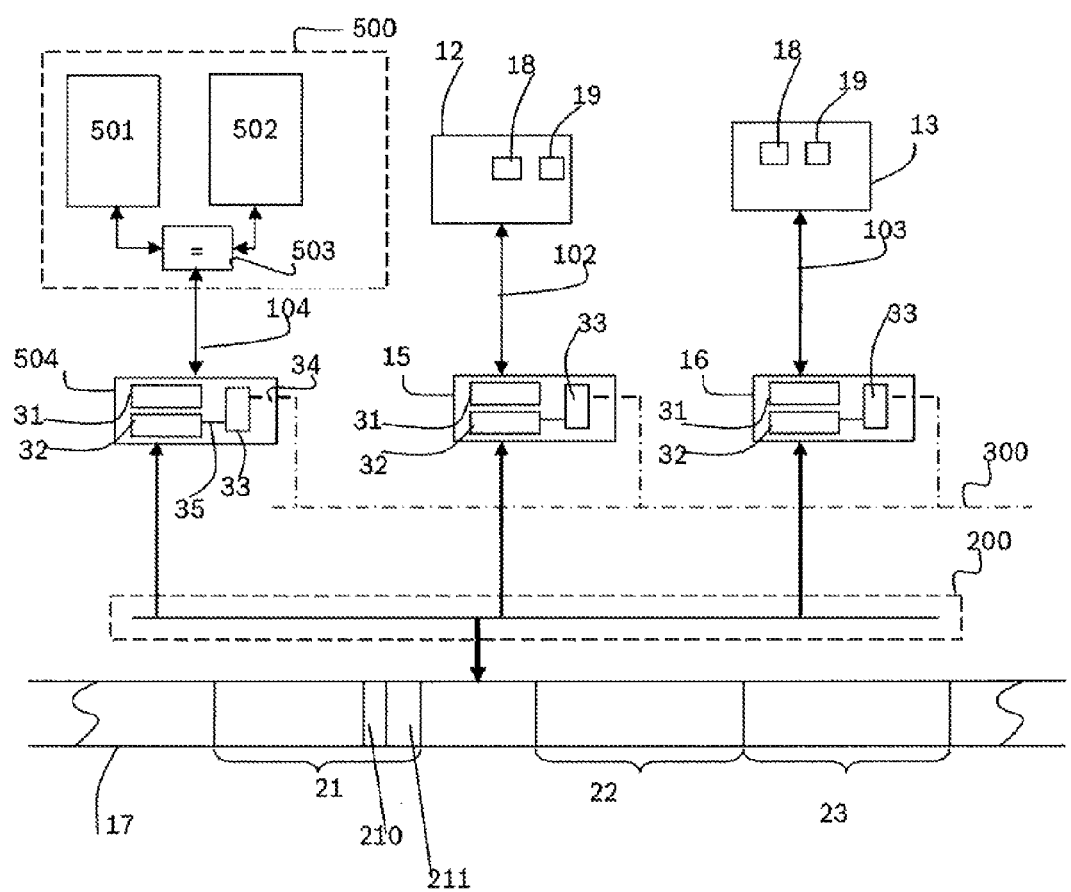
FIG. 2 shows a multiprocessor system having a safe core for programming memory protection unit.

FIG. 2 shows a system having a safe core 500. The safe core 500 is an operational pair of processing devices 501 and 502 in a lock step mode. Alternatively the safe core can be realised as a CPU supervised by a monitoring CPU. A first processing device 501 and a second processing device 502 are connected to a comparator 503. The processing device 501, the processing device 502 and the comparator 503 form a logical core called a safe core 500. The safe core 500 and the memory protection unit 504 are connected each other via a communication line 104. The memory protection unit 504 is connected to the memory device 17 via system bus 200. Other elements and connections shown in the FIG. 2 like memory device 17, processing devices 12, 13, memory protection units 15, 16, communication line 102, 103, reset line 300 and the system bus 200 are the same devices and perform the same function as described in FIG. 1. The comparator 503 monitors the outputs of the two processing devices 501, 502 and flags an error in the case of a discrepancy.

A lock step is a technique used to achieve high fault detection capability in a micro-processor system. This is done by adding a second identical processing device 502 to a system that monitors and verifies the operation of the first processing device 501. The two processing devices 501, 502 are initialized to the same state during system start-up, and they receive the same inputs, so during normal operation the state of the two processing devices 501, 502 are identical from clock to clock. They are said to be operating in lock step. The lock step technique assumes that an error in either processing device 501 or 502 will cause a difference between the states of the two processing devices 501, 502 which will eventually be manifested as a difference in the outputs, so the lockstep system monitors the outputs of the two processors and flags an error in the case of a discrepancy.

A time or clock delay can be provided between the processing device 501 and the processing device 502. The two processing device 501, 502 therefore process the same program with a little delay in time, for example 1.5 or 2 cycles difference. So if a random error happens the two processing devices 501, 502 do not perform the same error at the same cycle but shifted by the delay. So this time delay is a method to detect and therefore eliminate random error in the execution of the program on both processing devices 501, 502. The delay of the input and output data allows the safe core 500 to reduce some faults that may occur in a processing device.

The second access control unit 32 of memory protection unit 504 can be an optional unit as the logical core is already a safe core and therefore the second access control unit 32 of the memory protection unit 504 may not required. If the complete memory protection unit is present, the first access control unit 31 and the second access control unit 32 of the memory protection unit 504 is programmed by a safe core 500 itself. The second access control unit 32 of the memory protection unit 504 is programmed during the initialization of the safe core 500. The first access control unit 31 of the memory protection unit 504 is programmed dynamically during operation for each task that is executed by the safe core 500.

The second access control unit 32 of memory protection units 15 and 16 are programmed by the safe core 500. Preferably this is also done during initialization. The required admissible addresses are programmed appropriately. The correct programming can be ensured through a simple reading test that can be executed by the safe core 500 itself.

The advantage of having the safe core is that it allows to control the whole system because the capability of fault detection of the safe core 500 is so high.

Figure 3:
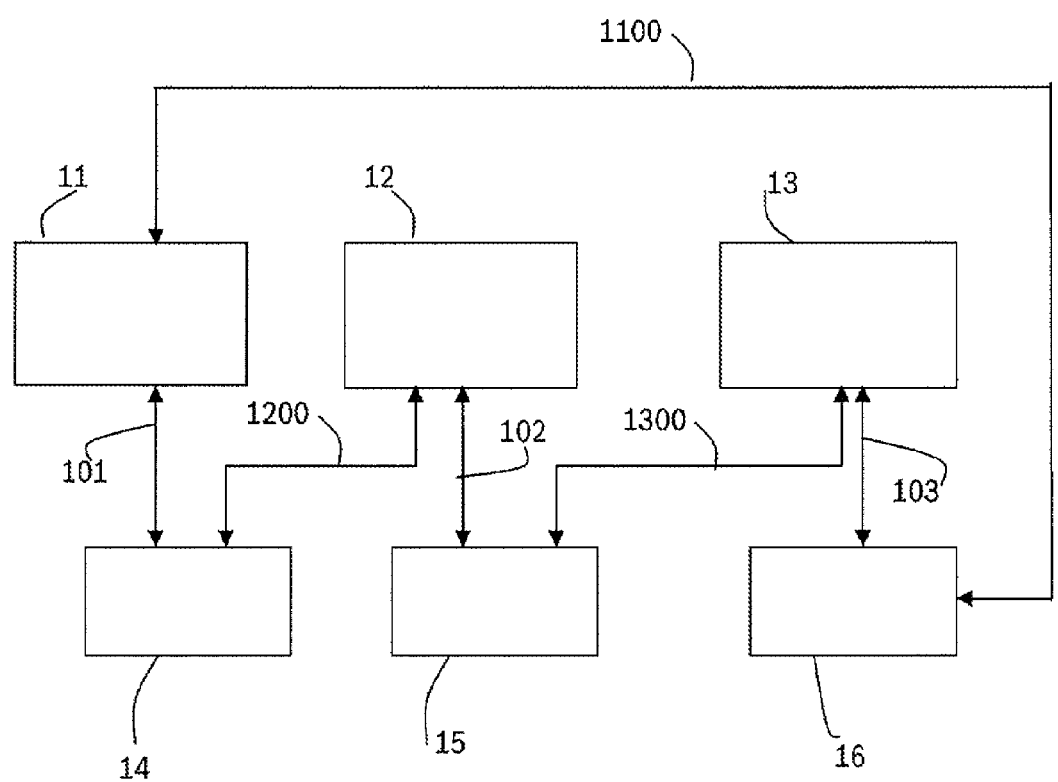
FIG. 3 and FIG. 4 shows how the processing devices 11, 12, 13 can access the memory protection units 14, 15, 16 for the purpose of either programming or reading the programming of the second access control units 32.
Figure 4:
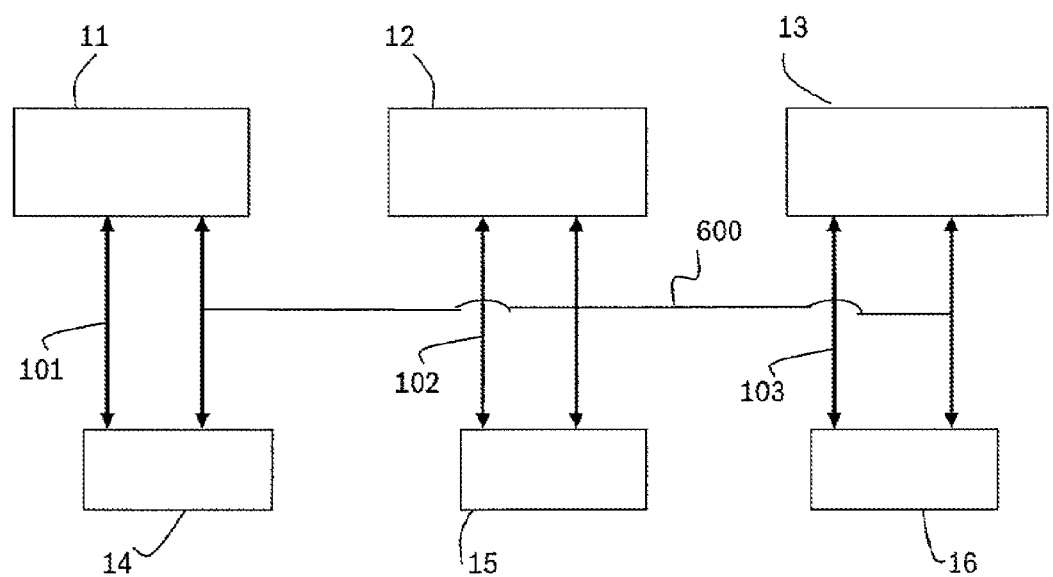
Figure 5:
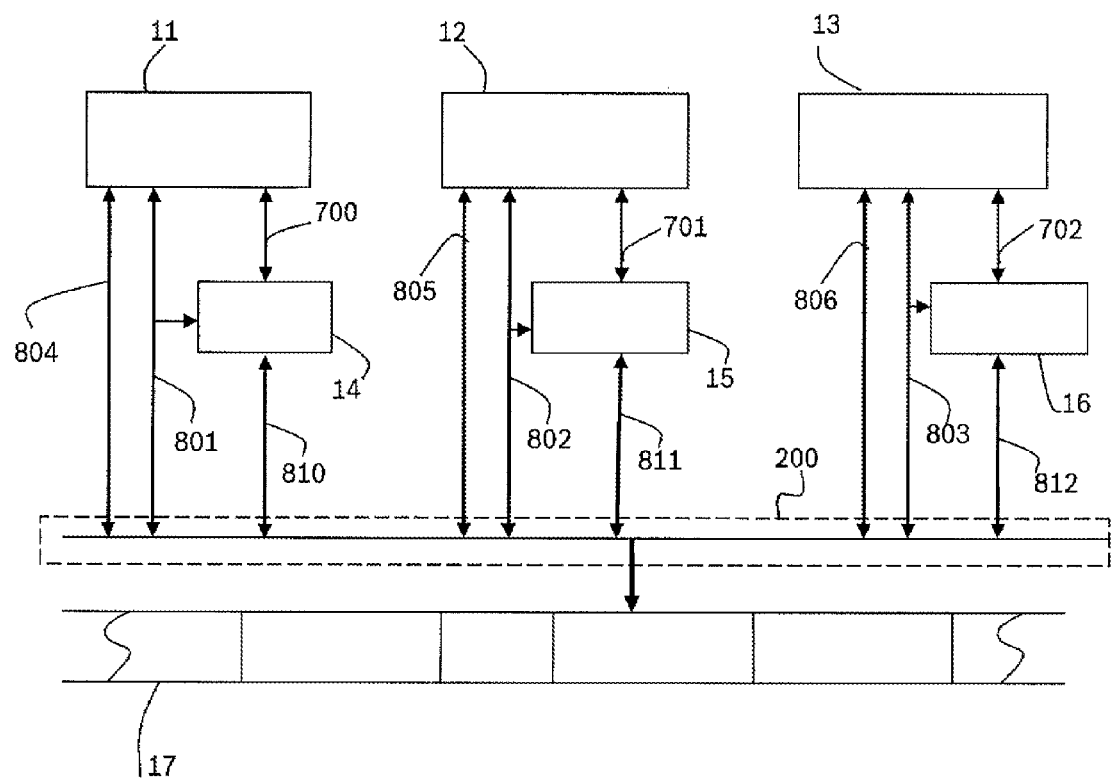
FIG. 5 shows an alternative connection between the processing devices 11, 12, 13, the bus system 200 and the memory device 17.

The following FIGS. 3, 4 and 5 describe how the processing devices 11, 12, 13 can access the memory protection units 14, 15, 16 for the purpose of either programming the different second access control units 32 or read the programming of the second access control units 32.

FIG. 3 shows the three processing devices 11, 12, 13 and the three memory protection units 14, 15, 16 which were described in the FIGS. 1 and 2. The memory protection unit 14 is connected with the communication line 101 to the associated processing device 11. The memory protection unit 15 is connected with the communication line 102 to the associated processing device 12. The memory protection unit 16 is connected with the communication line 103 to the associated processing device 13. For the reason of simplicity the internal structure of the memory protection units 14, 15, 16, the bus system 200 and the memory device 17 are not shown. Further the memory protection unit 14 is connected with a further communication line 1200 to the processing device 12. The memory protection unit 15 is connected with a further communication line 1300 to the processing device 13. The memory protection unit 16 is connected with a further communication line 1100 to the processing device 11. With this arrangement the communication between the processing devices 11, 12, 13 and the memory protection units 14, 15, 16 is only possible over the communication lines. Memory protection unit 14 can communicate with the associated processing device 11 and the further processing device 12. Memory protection unit 15 can communicate with the associated processing device 12 and the further processing device 13. Memory protection unit 16 can communicate with the associated processing device 13 and the further processing device 11. Such a fixed wire connection can be used if the associated processing device 11, 12, 13 can program the associated memory protection unit 14, 15, 16 and the programming can be controlled by any other processing device. Naturally the flexibility is low since a communication line have to be established and can not be changed easily.

A further system having more flexibility is shown is FIG. 4. FIG. 4 shows the three processing devices 11, 12, 13 and the three memory protection units 14, 15, 16 which were described in the FIGS. 1 and 2. The memory protection unit 14 is connected with the communication line 101 to the associated processing device 11. The memory protection unit 15 is connected with the communication line 102 to the associated processing device 12. The memory protection unit 16 is connected with the communication line 103 to the associated processing device 13. For the reason of simplicity the internal structure of the memory protection units 14, 15, 16, the bus system 200 and the memory device 17 are not shown. Further all the processing devices 11, 12, 13 and all the memory protection units 14, 15, 16 are connected to a further bus system 600. This further bus system 600 is independent of the bus system 200 as it is described in the FIGS. 1 and 2. The further bus system 600 allows communication between every processing device 11, 12, 13 and every memory protection unit 14, 15, 16. This arrangement can be used for any of the methods to program the memory protection units 14, 15, 16 by the processing devices 11, 12, 13. The further bus system 600 can allow any processing device 11, 12, 13 to program any memory protection unit 14, 15, 16. The further bus system 600 allows any processing device 11, 12, 13 to read the programming of any memory protection unit 14, 15, 16 and therefore allows to control and check the correctness of the programming of the second access control units 32. The system of FIG. 4 needs separate further bus system 600 besides the normal bus system 200. So it involves extra effort compared to the system shown in FIGS. 1 and 2.

A further method to establish a communication between the processing devices 14, 15, and 16 is using the bus system 200. The advantage of this is that no further bus lines are needed. The disadvantage is that the bus load on the bus system 200 increases and the processing devices 11, 12, 13 need appropriate software to handle this further communication via the bus system 200. But this type of communication is very flexible and need no further effort.

In FIGS. 1 and 2 the processing devices 11, 12, 13 had no direct connection to the bus system 200 but were only connected to the bus system 200 via the memory protection units 14, 15, 16. FIG. 5 shows an alternative connection between the processing devices 11, 12, 13 and the bus system 200 which still involves the memory protection unit to grant or deny access to the bus system 200 or the memory device 17.

The processing device 11 is connected to the bus system 200 via an address bus 801 and a data bus 804. The memory protection unit 14 is connected with the address bus 801 to the associated processing device 11 and also connected with an enable line 700 to the associated processing device 11. The processing device 12 is connected to the bus system 200 via an address bus 802 and a data bus 805. The memory protection unit 15 is connected with the address bus 802 to the associated processing device 12 and also connected with an enable line 701 to the associated processing device 12. The processing device 13 is connected to the bus system 200 via an address bus 803 and a data bus 806. The memory protection unit 15 is connected with the address bus 803 to the associated processing device 13 and also connected with an enable line 702 to the associated processing device 13. The memory protection unit 14 is connected with a control line 810 to the bus system 200. The memory protection unit 15 is connected with a control line 811 to the bus system 200. The memory protection unit 16 is connected with a control line 812 to the bus system 200. The control lines 810, 811 and 812 are used to control access to the bus system 200 or the memory device 17. The memory protection unit 14, 15 16 sends a control signal on these control lines 810, 811 and 812 such as a read enable, a write enable, a memory select signal or input/output signal to the bus system 200 or to the memory device 17. For the reason of simplicity the internal structure of the memory protection units 14, 15, 16 are not shown.

The processing devices 11, 12, 13 can issue a command for reading or writing the memory device 17 or to access the bus system 200. The processing devices 11, 12, 13 places an access addresses on the address bus 801, 802, 803 and by transmitting a control signals such as a read enable or a write enable signal on the enable lines 700, 701, 702. The memory protection units 14, 15, 16 observe the access addresses on the address bus 801, 802, 803 together with the read enable or write enable signal on the enable lines 700, 701, 702. The memory protection units 14, 15 and 16 compare the access addresses with the addresses that are stored in the first access control unit 31 and second access control unit 32 of each memory protection unit. If the addresses are valid addresses, the memory protection units 14, 15, 16 grant the access to the associated processing devices 11, 12, 13 by transmitting a control signal on the control lines 810, 811 and 812 to access the bus system 200 or the memory device 17. The control signal can be a read enable or a write enable signal on the bus system 200 or to the memory device 17. If the addresses are not valid addresses, the memory protection units 14, 15, 16 denies access to the associated processing devices 11, 12, 13 by deactivating the control lines 810, 811, 812. Granting or rejecting the access to the bus system 200 or to the memory device 17 to the associated processing devices 11, 12, 13 is controlled through the control lines 810, 811, 812. Thus the memory protection units 14, 15, 16 observe the access addresses on the address bus 801, 802, 803 and control the access to the bus system 200 or the memory device 17.

The second access control unit 32 of the memory protection units 14, 15, 16, 504 is programmed once after a reset. Therefore the memory protection units 14, 15, 16 as shown in the FIG. 1, to FIG. 5 comprise a hardware unit 33 that is used for programming of the second access control unit 32. The hardware unit 33 has a hardware element which needs a specific input and allows the programming of the second access control unit 32.

The hardware unit 33 has a reset detection that is connected to a reset line 300 through the external pin 34. The programming of the second access control unit 32 is coupled with a reset signal through the hardware unit 33. The reset signal is given to an external pin 34. The reset detection detects the reset signal which is then applied to the internal reset signal 35 to enable the programming of the second access control unit 32. After the reset the second access control unit 32 is ready for programming. The reset detection may generate an interrupt to the safe core 500 or to the predefined processing device 11, 12, 13 to program the second access control unit 32. Alternatively the reset detection may simply enable programming and after programming disable access to the second access control unit 32. The second access control unit 32 is then programmed by the safe core 500 or by the predefined processing device 11, 12, 13 as described earlier. There are different possibilities for programming second access control unit 32 in conjunction with the reset detection and the hardware unit 33.

1. A first possibility is to combine a reset detection with one time programming. The hardware unit 33 can have a register which ensures that the second access control unit 32 is programmed exactly one time after a reset.

After the second access control unit 32 is programmed, subsequent write access to the second access control unit 32 triggers an error.

2. A second possibility is to combine reset detection with a lock register. The hardware unit 33 can have a lock register which ensures that the second access control unit 32 can be programmed only if the lock register is accessed in a certain form. An access to the lock register is allowed during initialization or after a reset. The lock register of the hardware unit 33 allows to enable or disable programming of the second access control unit 32.

3. A third possibility is to combine reset detection with a timer. The hardware unit 33 can have a timer control register which ensures that the second access control unit 32 could be written within a predefined time after a reset. After the second access control unit 32 is programmed, subsequent write access to the second access control unit 32 triggers. The timer control register can be programmed to hold the predefined time.

The invention claimed is:

1. A memory protection unit for use in a system with multiple processing devices connected to a memory device, the memory protection unit being associated with one of the multiple processing devices such that the associated processing device can only access the memory device through the memory protection unit, the memory protection unit comprising:
at least a first access control unit and a second access control unit, the first access control unit and the second access control unit being programmed for controlling access to the memory device by the associated processing device, each of the first access control unit and the second access control unit including programming that defines addresses of the memory device that are designated for access by the associated processing device, the first and the second access control unit each being configured to reject access to addresses of the memory device that are not designated for access by the associated processing device;
wherein access to a particular address of the memory device by said associated processing device is approved if the first access control unit and the second access control unit approve the access and access is rejected if the first access control unit or the second access control unit rejects the access;
wherein the first access control unit is configured to be programmed by the associated processing device alone; and
wherein the second access control unit is configured to be programmed with the programming only after a reset, the second access control unit being programmable a single time and/or within a predefined time period after the reset, and
wherein the programming of the second access control unit is readable by an additional processing device of the multiple processing devices other than the associated processing device for checking correctness of the programming of the second access control unit.

2. The memory protection unit according to claim 1, further comprising:
a hardware unit coupled to the second access control unit and configured to enable programming of the second access control unit in response to the reset.

3. The memory protection unit according to claim 2, wherein the hardware unit is coupled to an external pin and configured to receive a reset signal via the external pin, and wherein the hardware unit is configured to enable the programming of the second access control unit in response to receiving the reset signal.

4. The memory protection unit according to claim 2, wherein the hardware unit has a lock register to enable or disable reprogramming of the second access control unit.

5. The memory protection unit according to claim 4, wherein an access to the lock register is allowed only after reset.

6. The memory protection unit according to claim 2, wherein the hardware unit has a timer, the hardware unit being configured to allow programming of the second access control unit within the predefined time period after reset of the second access control unit using the timer and a later programming initiates an error signal by the hardware unit.

7. The memory protection unit of claim 1, wherein the programming of the first access control unit defines the addresses of the memory device which are allowed to be accessed by tasks executed by the associated processing device.

8. The memory protection unit of claim 7, wherein the first access control device is reprogrammed by the associated processing device depending on the which task is to be executed by the associated processor so that different tasks are allowed to access different addresses of the memory device.

9. The memory protection unit of claim 8, wherein the first access control device is reprogrammed dynamically by an operating system of the associated processing device.

10. The memory protection unit of claim 7, wherein the programming of the second access control unit defines all the addresses of the memory device that are allocated to the associated processing device.

11. A method to operate a processing system comprising multiple processing devices with associated memory protection units via which the processing devices access a memory device, comprising:
using a processing device to program a first access control unit of the memory protection unit associated with the processing device with addresses of the memory device that are accessible by the processing device;
programming a second access control unit of the memory protection unit associated with the processing device with addresses of the memory device that are accessible by the associated processing device, the second access control unit being programmable only after a reset and only a single time and/or within a predefined time period after the reset;
checking a correctness of the programming of the second access control unit of the memory protection unit associated with the processing device using one of the processing devices other than the processing device associated with the memory protection unit to determine correctness of the programming of the second access control unit;
comparing addresses associated with memory access requests from a processing device with the addresses programmed into the first and second access control units of the memory protection units associated with the processing device; and
controlling access to the memory device by the processing device based on the comparison.

12. The method according to claim 11, wherein the programming of the second access control unit requires a reset signal to the multiple programming devices and the second access control unit is reprogrammable for one time by the processing device that is not the associated processing device of the memory protection unit.

13. The method according to claim 11, wherein checking the correct programming of the second access control unit is done periodically, and if a check failure occurs, an error signal is generated.

14. The method according to claim 11, wherein checking the correct programming of the second access control unit is done if the second access control unit is reprogrammed.

15. The method according to claim 11, wherein programming of the second access control unit and checking for correctness of the program can be done by a safe core.

* * * * *